United States Patent
Tsao

(10) Patent No.: US 8,130,788 B2
(45) Date of Patent: Mar. 6, 2012

(54) METHOD FOR ADJUSTING TRANSMISSION SPEED OF WIRELESS NETWORK

(75) Inventor: Chu Hsin Tsao, Hsinchu County (TW)

(73) Assignee: Ralink Technology Corporation, Hsinchu County (TW)

( * ) Notice: Subject to any disclaimer, the term of this patent is extended or adjusted under 35 U.S.C. 154(b) by 703 days.

(21) Appl. No.: 12/237,612

(22) Filed: Sep. 25, 2008

(65) Prior Publication Data

US 2009/0147732 A1 Jun. 11, 2009

(30) Foreign Application Priority Data

Dec. 6, 2007 (TW) .............................. 96146457 A

(51) Int. Cl.
*G01R 31/08* (2006.01)
*H04W 4/00* (2009.01)
*H04J 3/16* (2006.01)

(52) U.S. Cl. ...................... 370/465; 370/252; 370/333

(58) Field of Classification Search ................. None
See application file for complete search history.

(56) References Cited

U.S. PATENT DOCUMENTS

| 7,369,510 B1 * | 5/2008 | Wong et al. ................ 370/252 |
| 7,653,408 B1 * | 1/2010 | Kopikare et al. ........... 455/522 |
| 2001/0055959 A1 * | 12/2001 | Shen et al. ................ 455/277.1 |

* cited by examiner

*Primary Examiner* — Kwang B Yao
*Assistant Examiner* — Jutai Kao
(74) *Attorney, Agent, or Firm* — WPAT, P.C.; Anthony King

(57) ABSTRACT

A method for adjusting a transmission speed of a wireless network comprises the steps of: setting a transmission mode, wherein the transmission mode is either an idle mode or a traffic mode; setting an environmental case, wherein the environmental case is either an ideal case or a corner case; determining a transmission speed adjusting algorithm according to the transmission mode and environmental case; and determining an updated transmission speed according to the transmission speed adjusting algorithm.

7 Claims, 4 Drawing Sheets

METHOD FOR ADJUSTING TRANSMISSION SPEED OF WIRELESS NETWORK

BACKGROUND OF THE INVENTION

1. Field of the Invention

The present invention relates to a method for adjusting a transmission speed of a wireless network, and more particularly to a method for adjusting a transmission speed of a wireless network in accordance with a packet error rate and/or the strength of received signals.

2. Description of the Related Art

In a normal wireless network environment, there are many interfering sources and unstable states, such as interferences in the same frequency band, antenna parameters and multipath signal interferences. Therefore it is common practice to set different transmission speeds in order to maintain the signal at a constant quality. However, the conventional regular adjusting methods did not consider special conditions or environment. Therefore under some special condition or environment, the quality of the adjusted outcome might be worse than that produced under normal conditions. For example, in a high-noise environment, it is common that a bad starting or updated transmission speed slow down the average transmission throughput. Additionally, a bad starting transmission speed will cause the system to take a lot of time to reach its optimal speed. As shown in FIG. 1, the wireless transmission apparatus needs some time to adapt to the existing environment, and the system takes eight seconds to reach its optimal speed.

Based on the above shortcomings, it is necessary to evaluate the situation and environment before setting the transmission speed of the wireless network so as to provide an ideal transmission quality for wireless networks.

SUMMARY OF THE INVENTION

The method for adjusting a transmission speed of a wireless network in accordance with one embodiment of the present invention comprises the steps of: setting a transmission mode, wherein the transmission mode is either an idle mode or a traffic mode; setting an environmental case, wherein the environmental case is either an ideal case or a corner case; determining a transmission speed adjusting algorithm according to the transmission mode and environmental case; and determining an updated transmission speed according to the transmission speed adjusting algorithm.

The method for adjusting a transmission speed of a wireless network in accordance with one embodiment of the present invention comprises the steps of: setting a table, wherein the table includes lower and upper thresholds of packet error rates corresponding to different transmission speeds; varying a transmission speed according to the table if an ideal case is determined to exist; and varying a transmission speed according to a multiple of the upper and lower thresholds of the packet error rates if a corner case is determined to exist.

The method for adjusting a transmission speed of a wireless network in accordance with another embodiment of the present invention comprises the steps of: updating to a second transmission speed if a packet error rate of a first transmission speed is beyond upper and lower thresholds; calculating a packet error rate of the second transmission speed, wherein a computation time for the second transmission speed is less than half a computation time for the first transmission speed; and returning to the first transmission speed if the packet error rate of the second transmission speed is further outside the eclipsed threshold than that of the first transmission speed.

BRIEF DESCRIPTION OF THE DRAWINGS

The invention will be described according to the appended drawings in which.

PREFERRED EMBODIMENT OF THE PRESENT INVENTION

Figure 1:
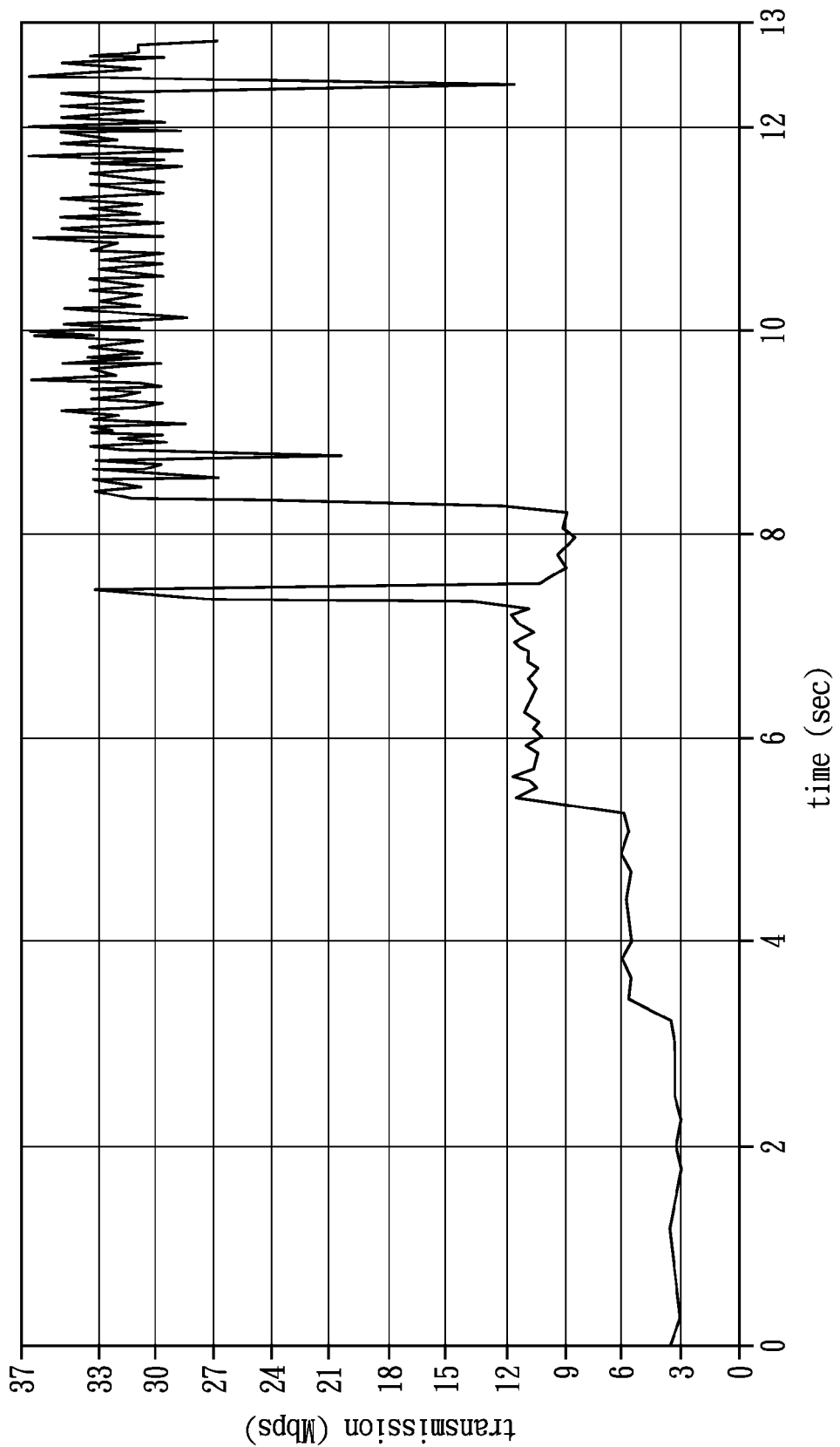
FIG. 1 shows a transmission speed variance in conventional wireless network.
Figure 2:
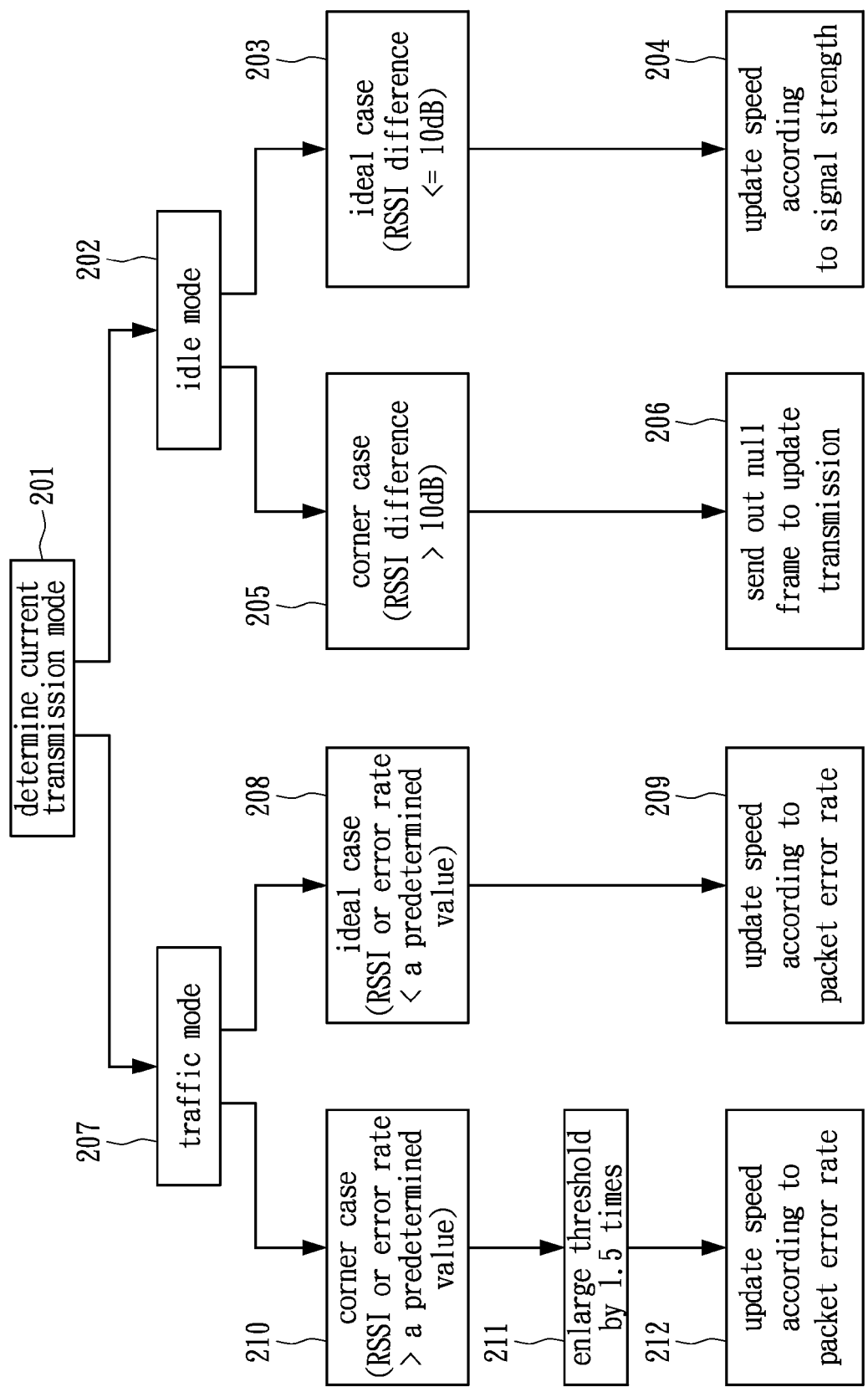
FIG. 2 shows a flow chart of adjusting transmission speed of a wireless network in accordance with one embodiment of the present invention.

FIG. 2 shows a flow chart of adjusting a transmission speed (such as 802.11n high speed wireless network) of a wireless network in accordance with one embodiment of the present invention. In step 201, it is first determined whether the current working mode is an idle mode or a traffic mode. The so-called idle mode means a state of sending out no packets (or a state of sending out only very few packets); therefore it is not easy to calculate a correct packet error rate (PER), wherein PER is obtained by the number of re-sent packets divided by the number of total packets sent. If the working mode is the idle mode, the step 202 is performed; otherwise step 207 is performed. After step 202 is performed, it is determined whether the environment under the idle mode is an ideal case or a corner case. If it is the ideal case, then step 203 is performed; otherwise step 205 is performed. The so-called ideal case means the signals received by multiple antennas are of similar strengths. In contrast, a corner case may be caused by the antennas facing unfavorable directions relative to the transmitters, which results in largely dissimilar signal strength of received signals. To determine whether the current state is an ideal case or a corner case, the difference in Receiver Signal Strength Indication (RSSI) for the antennas is found. For example, a line of RSSI being 10 dBm is drawn. It is determined as an ideal case if the difference is less than 10 dBm; otherwise, as a corner case. If an ideal case is determined to exist, then step 204 is performed, and transmission speed is updated in accordance with RSSI. Generally, a slower speed can transmit a greater distance, but corresponds to smaller throughput.

```
if (MCS15 && (RSSI >= -70dBm))
    TxRate = MCS15;
else if (MCS14 && (RSSI >= -72dBm))
    TxRate = MCS14;
else if (MCS13 && (RSSI >= -76dBm))
    TxRate = MCS13;
else if (MCS12 && (RSSI >= -78dBm))
    TxRate = MCS12;
else if (MCS04 && (RSSI >= -82dBm))
    TxRate = MCS04;
else if (MCS03&& (RSSI >= -84dBm))
    TxRate = MCS03;
else if (MCS02 && (RSSI >= -86dBm))
    TxRate = MCS02;
else if (MCS01 && (RSSI >= -88dBm))
    TxRate = MCS01;
else
    TxRate = MCS00
```

Wherein MCS15 to MCS00 represent transmission speeds from highest to lowest, and TxRate represents an updated transmission speed. As the algorithm describes, the signal is transmitted at MCS15 first, RSSI is examined, and if it is greater than −70 dBm, then the transmission speed of MCS15 is maintained. Otherwise, MCS14 is selected to transmit the signal, and RSSI is examined. If it is greater than −72 dBm, then the transmission speed of MCS14 is maintained. Otherwise, MCS13 is selected to transmit the signal, and so on.

If the difference of RSSI is greater than 10 dBm, then it is determined that the current environment is a corner case, step 206 is performed, and null frames serving as speed indicators are sent out beforehand to change the transmission speed. The null frames are sent out upon start-up of the system, and are used to determine updated initial transmission speed in accordance with feedback error rate and predetermined threshold in table 1. Because the ideal transmission speed of the corner case is expected to be less than that of a standard case, only the line of decreasing speed in table 1 is necessary. Because the present invention adjusts the transmission speed to the optimum in idle mode, a lot of time is saved and the drawbacks of the prior art are thus resolved.

TABLE 1

| Transmission speed | Increasing speed if lower than % | Decreasing speed if higher than |
|---|---|---|
| MCS15 | N/A | 25 |
| MCS14 | 08 | 25 |
| MCS13 | 08 | 20 |
| MCS12 | 08 | 20 |
| MCS04 | 15 | 30 |
| MCS03 | 15 | 50 |
| MCS02 | 15 | 50 |
| MCS01 | 15 | 50 |
| MCS00 | 20 | N/A |

As shown in table 1, if an initial RSSI is greater than −70 dBm, the null frames are transmitted first at speed MCS15. If the error rate is higher than the upper threshold, then the transmission speed will be reduced one step to MCS14; otherwise the current transmission speed is maintained. After entering MCS14, the null frames are transmitted at speed MCS14. If the error rate is higher than the upper threshold, then the transmission speed will be reduced one step to MCS13; if the error rate is less than the lower threshold, the transmission speed is increased to MCS15; otherwise the current transmission speed remains. Other steps follow the same rule.

Under a traffic mode, if the RSSI or packet error rate is lower than a predetermined value, then it is determined that the current environment is an ideal one, and step 208 is performed; otherwise step 210 is performed. Under an ideal case, step 209 is performed, in which a signal is transmitted according to the previous transmission speed and the transmission speed is changed according to the thresholds in table 1. If the current environment is a corner case representing a high-noise environment, step 211 is performed to enlarge the threshold in table 1 by 1.5 times or between 1.3 and 1.7 times. Subsequently, step 212 is performed to change the transmission speed. The threshold in table 1 is enlarged by 1.5 times in order to analyze the fluctuation resulting from a high-noise environment affecting the signal strength and packet error rate. In situations where the thresholds in table 1 are continuously used without modification, the transmission rate could excessively decrease due to continuous exceeding of the thresholds, and an unnecessarily low throughput would result. Therefore, to adapt for corner cases, it is necessary to multiply the threshold in table 1 by a factor.

Figure 3:
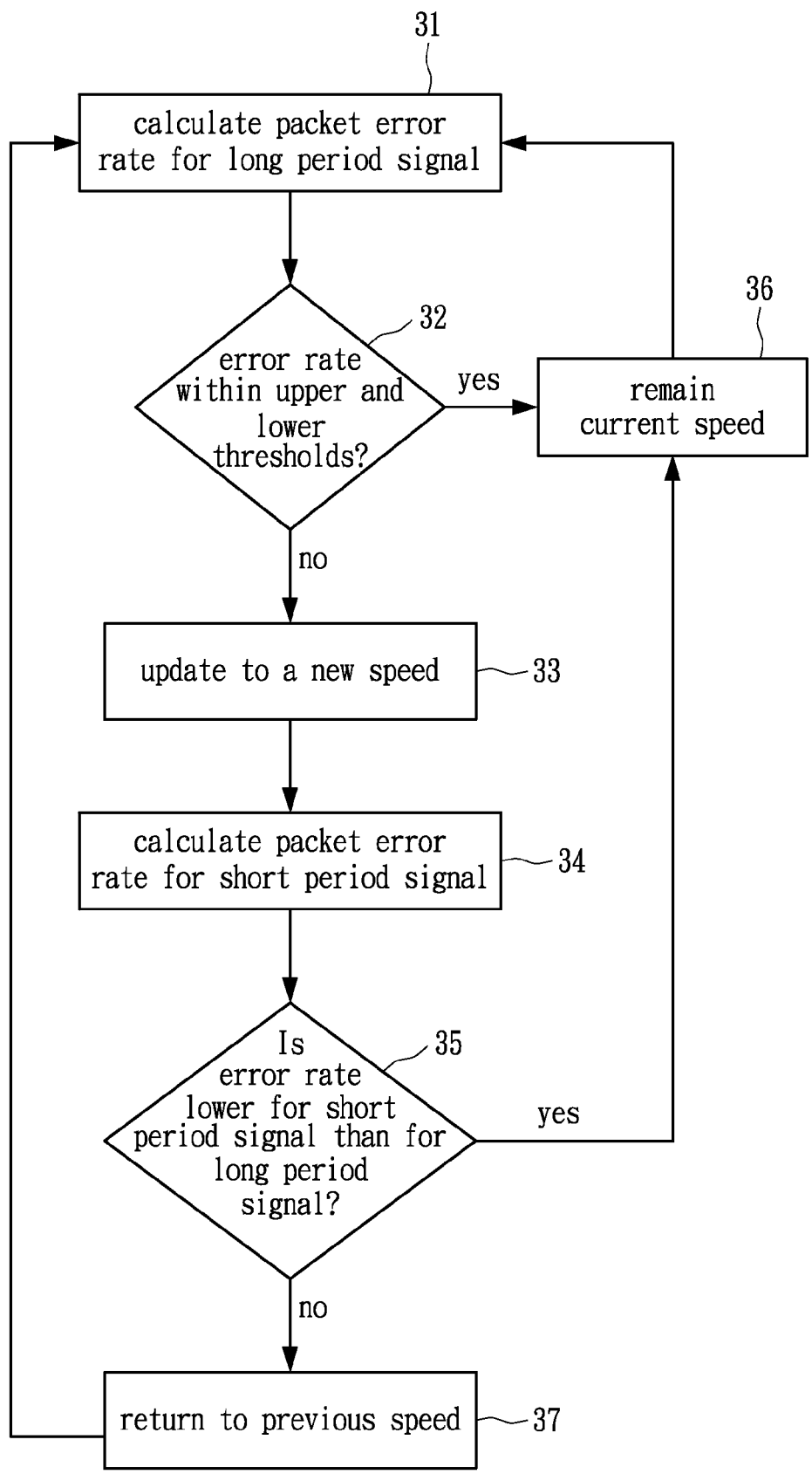
FIG. 3 shows a flow chart of adjusting transmission speed of a wireless network according to error rate based on one embodiment of the present invention.

FIG. 3 shows a flow chart of adjusting the transmission speed of a wireless network according to the error rate based on one embodiment of the present invention. An unstable state may be caused as a result of the fact that transmission speed falls repeatedly outside the upper and lower thresholds in table 1 and thus continuously varies between adjacent transmission speeds. This embodiment is designed to resolve this problem. In step 31, a long-period (e.g., one second) signal is transmitted in accordance with the current transmission speed and obtains a corresponding packet error rate. In step 32, it is determined according to table 1 whether the long-period packet error rate is within the upper and lower thresholds. In step 36, if the packet error rate is within the threshold, the current transmission speed is retained. In step 33, if the packet error rate is outside the threshold, a new transmission speed according to table 1 is selected to transmit a short-period (e.g., 50 ns) signal. In step 34, a corresponding packet error rate is obtained based on the short-period signal. In step 35, a comparison is made between the packet error rates of the long-period and short-period signals. If the packet error rate of the short-period signal is further outside the threshold than that of the long-period signal, then step 36 is performed and the updated transmission rate remains. Otherwise, step 37 is performed and returns to the previous transmission speed.

Figure 4:
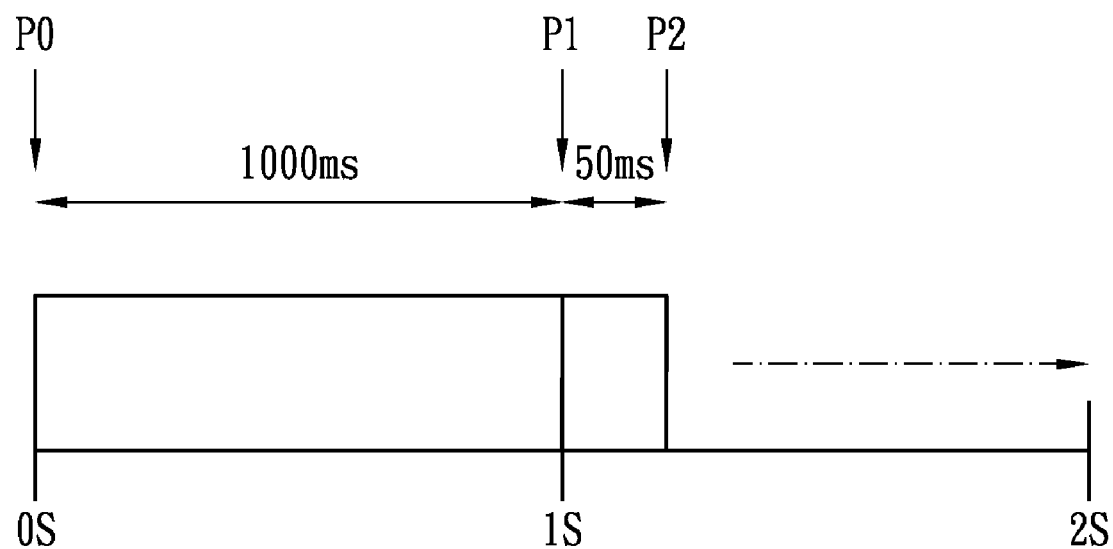
FIG. 4 shows an illustration of the above flow chart.

FIG. 4 shows an illustration of the above-described flow chart. The period of P1-P2 occupies merely 50 ns, which is one-twentieth the period of P0-P1, which is 100 ns. Because the present embodiment can determine whether the previous modification to transmission speed was optimal in the initial 50 ns, instead of requiring the entire 100 ns cycle, the present invention can quickly determine the optimum transmission speed and avoid unstable fluctuations of transmission speed. The period of P1-P2 is less than half the period of P0-P1, preferably under one-fourth, one-eighth, one-sixteenth or one-twentieth.

The above-described embodiments of the present invention are intended to be illustrative only. Numerous alternative embodiments may be devised by persons skilled in the art without departing from the scope of the following claims.

What is claimed is:

1. A method for adjusting a transmission speed of a wireless network, comprising the steps of:
setting a transmission mode, wherein the transmission mode comprises an idle mode and a traffic mode;
setting an environmental case, wherein the environmental case comprises an ideal case and a corner case;
determining a transmission speed adjusting algorithm according to the transmission mode and environmental case, wherein the transmission speed adjusting algorithm in the idle mode and corner case determines the updated transmission speed in accordance with a packet error rate of a null frame; and
determining an updated transmission speed according to the transmission speed adjusting algorithm;
wherein the method for adjusting a transmission speed of a wireless network is executed by a computation device.

2. The method of claim 1, wherein the transmission speed adjusting algorithm in the traffic mode determines the updated transmission speed in accordance with a received signal strength and/or packet error rate.

3. The method of claim 1, wherein the transmission speed adjusting algorithm in the idle mode and ideal case determines the updated transmission speed in accordance with a received signal strength.

4. The method of claim 1, wherein the transmission speed adjusting algorithm in the traffic mode determines the updated transmission speed in accordance with a packet error rate.

5. A method for adjusting a transmission speed of a wireless network, comprising the steps of:
- setting a transmission mode, wherein the transmission mode comprises an idle mode and a traffic mode;
- setting an environmental case, wherein the environmental case comprises an ideal case and a corner case;
- determining a transmission speed adjusting algorithm according to the transmission mode and environmental case, wherein the transmission speed adjusting algorithm in traffic mode determines the updated transmission speed in accordance with a packet error rate and a plurality of thresholds, and the threshold in the traffic mode and corner case is a multiple of the threshold in traffic mode and ideal case, wherein the multiple is a number greater than one; and
- determining an updated transmission speed according to the transmission speed adjusting algorithm;
- wherein the method for adjusting a transmission speed of a wireless network is executed by a computation device.

6. The method of claim 5, wherein the multiple is between 1.3 and 1.7.

7. The method of claim 1, which is used in 802.11n for transmission speed adjustment.

* * * * *